United States Patent [19]

Fujita et al.

[11] Patent Number: 4,682,973
[45] Date of Patent: Jul. 28, 1987

[54] V-BELT FOR HIGH LOAD POWER TRANSMISSION

[75] Inventors: Kunihiro Fujita, Nishinomiya; Hideaki Tanaka, Kobe, both of Japan

[73] Assignee: Mitsuboshi Belting Ltd., Nagata, Japan

[21] Appl. No.: 842,152

[22] Filed: Mar. 21, 1986

[51] Int. Cl.$^4$ .............................................. B65G 15/34
[52] U.S. Cl. ................................... 474/263; 198/847; 428/294; 428/295; 474/264; 474/265
[58] Field of Search .............. 474/260, 261, 263, 264, 474/265; 428/294, 295; 198/847

[56] References Cited

U.S. PATENT DOCUMENTS

| | | | |
|---|---|---|---|
| 3,657,938 | 4/1972 | Fisher | 474/263 |
| 4,027,545 | 6/1977 | White, Jr. | 474/263 |
| 4,096,764 | 6/1978 | Richmond et al. | 474/263 |
| 4,127,039 | 11/1978 | Hollaway, Jr. | 474/263 |
| 4,445,949 | 5/1984 | Hollaway, Jr. | 474/263 X |
| 4,504,258 | 3/1985 | Tanaka et al. | 474/263 |

FOREIGN PATENT DOCUMENTS 1382535 2/1975 United Kingdom .

Primary Examiner—Stephen J. Novosad
Attorney, Agent, or Firm—Wood, Dalton, Phillips, Mason & Rowe

[57] ABSTRACT

A power transmission V-belt for transmitting high loads with extended useful life. The portion of the V-belt in which the tensile elements thereof are embedded is formed of a rubber having short reinforcing fibers distributed therein and oriented longitudinally of the belt. Different embodiments of both wrapped and raw edge belts embodying the invention are disclosed. Embodiments in which the outermost portion of the tension section and the innermost portion of the compression section are free of the longitudinally extending short fibers are also disclosed. Preferred amounts of the short fiber material and the hardness of the rubber are disclosed.

13 Claims, 9 Drawing Figures

V-BELT FOR HIGH LOAD POWER TRANSMISSION

DESCRIPTION

1. Technical Field

This invention relates to power transmission belts and in particular to V-belts intended for high power transmission service.

2. Background Art

In one common form of V-belt for use in transmitting power as between pulleys, a plurality of longitudinally extending tensile cords are embedded in a layer of cushion rubber. An outer tension section of rubber is provided outwardly of the cushion rubber and an inner compression section of rubber is provided inwardly of the cushion rubber.

It is further conventional to cover the belt with a fabric, such as canvas. The canvas may completely encircle the belt, or may be applied only to the inner surface and outer surface thereof, with the sides of the belt defining raw edges.

A serious problem arises in the use of such conventional belts where high loads are transmitted. The stresses developed in the belt as a result of the high load transmission causes cracking to occur. Both longitudinal cracks and side cracks have been found to extend through the cushion rubber in which the tensile cords are embedded. Such cracks propagate to and into both the tension and compression sections of the belt, thereby substantially reducing the useful life of the belt.

One attempted solution to this problem has been to provide a distribution of short reinforcing fibers extending transversely across the belt in either or both of the compression and tension sections. Conventionally, approximately 5 to 10 parts by weight of such fibers are provided in such sections. While such a distribution of reinforcing fibers does increase the rigidity in the transverse direction, the use of such fibers has been found to cause the belt to be harder than desired. Because of the increase in the hardness, the prevention of cracks by such means is not completely satisfactory.

The inventors hereof have proposed previously, as disclosed in Japanese Utility Model Application Laid-open No. 60144/1979, the provision of a small amount of such short fibers, such as 0.1 to 3.0 parts by weight, in the compression rubber section, as illustrated in FIG. 9. It has been found that such construction does provide an improved long life by affording a limited degree of desired rigidity in the compression section. Such structure has been found, however, to be not completely satisfactory in extending the useful life of such belts because of the shifting of the tensile cords so that the spacing therebetween became irregular and some superposition occurred. As seen in FIG. 9, the prior art structure required the conventional use of a cushion rubber layer embedding the tensile cords in addition to the compression section provided with the longitudinally extending short fibers and the conventional outer tension section.

DISCLOSURE OF INVENTION

The present invention comprehends an improved V-belt structure which overcomes the deficiencies of the prior art structures in a novel and simple manner and provides substantially improved long, troublefree life of such a V-belt, notwithstanding the transmission of high loads thereby.

The improved V-belt construction of the present invention provides improved resistance to bending and cracking and unexpectedly provides improved transverse stability under severe high load conditions.

The belt construction is extremely simple and economical, while yet providing the improved durability and long life.

More specifically, the invention comprehends the provision of such a power transmission V-belt wherein the portion of the belt in which the tensile elements are embedded is formed of rubber having short reinforcing fibers distributed therein and oriented longitudinally of the belt.

In the present invention, the fibers are present in the ratio of approximately 0.1 to 3.0 parts to 100 parts of the rubber.

The rubber in which the tensile cords are embedded is caused to have a Shore A hardness of approximately 70° to 90°.

The tensile cords may be formed of conventional strong filamentary material. In the illustrated embodiment, the fibers have a length of approximately 2 mm to 20 mm and may be formed of suitable reinforcing material, such as natural fiber, artificial fiber, synthetic fiber, and inorganic fiber materials.

In the illustrated embodiment, the fibers comprise cut fibers.

A rubberized fabric cover may be provided on the inner and outer surfaces and also may be selectively provided on the side edges, as desired.

The fabric cover, in the illustrated embodiment, is made up of bias-laid plies, with the warps and wefts thereof disposed at a 90° to 140° crossing angle. The plies are preferably bias-laid.

In the disclosed embodiments, at least one of the outermost portion of the tension section and the innermost portion of the compression section is caused to be free of the longitudinally extending short fibers.

The invention comprehends that the entire belt body be formed of rubber having short reinforcing fibers distributed therein and oriented longitudinally of the belt, as desired. In all embodiments of the invention, the portion of the belt in which the tensile cords are embedded is provided with the longitudinally extending short fibers.

BRIEF DESCRIPTION OF THE DRAWING

Other features and advantages of the invention will be apparent from the following description taken in connection with the accompanying drawing wherein.

BEST MODE FOR CARRYING OUT THE INVENTION

Figure 1:
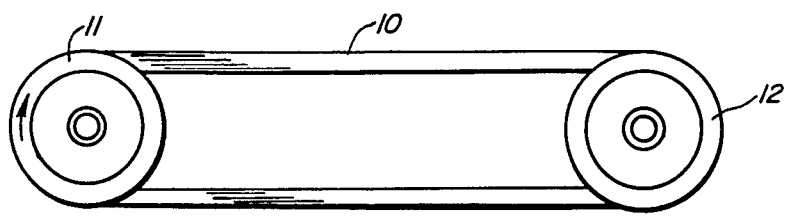
FIG. 1 is a schematic illustration of a drive belt embodying the invention, as used in transmitting power between a driver pulley and a driven pulley.

In the illustrative embodiments of the invention as disclosed in the drawing, a power transmission belt generally designated 10 embodying the invention is illustrated as for use in transmitting high loads between a driver pulley 11 and a driven pulley 12. As discussed briefly above, the belt of the present invention is adapted to provide such high load power transmission with an extended useful life.

Figure 2:
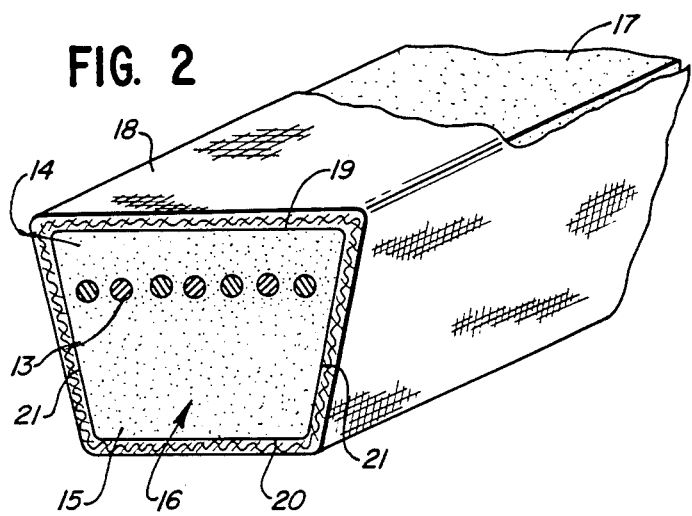
FIG. 2 is a fragmentary perspective view of a portion of a belt embodying the invention.

As shown in FIG. 2, power transmission belt 10 comprises a V-belt having a plurality of tensile cords 13 extending longitudinally of the belt in side-by-side spaced relationship transversely thereof. The tensile cords are embedded between an outer tension section 14 and an inner compression section 15. In the illustrated embodiment, the tension and compression sections are formed of similar rubber and are integrally joined between the tensile cords, whereby the belt body generally designated 16 comprises an integral unitary construction.

As further illustrated in FIG. 2, a distribution of short reinforcing fibers 17 is provided throughout the belt body. More specifically, the invention comprehends that the longitudinally extending short reinforcing fibers be provided in the rubber in which the tensile cords are embedded within the belt body and extend longitudinally of the belt therein.

Belt 10 is provided with an outer cover fabric 18 which may fully encircle the belt and thus cover the top surface 19 of the tension section, the bottom surface 20 of the compression section, and the side edges 21. The belt rubber may comprise conventional power transmission belt rubber which may be blend of a natural rubber, chloroprene rubber, and/or styrene butadiene rubber.

The tensile cords are preferably formed of conventional tensile cord material, such as polyester resin, aliphatic polyamide resin, aromatic polyamide resin, etc.

The rubber preferably has a Shore A hardness of 70° to 90°.

The short fibers 17 are preferably cut fibers formed of natural fiber, artificial fiber, synthetic fiber, inorganic fiber, etc., and in the illustrated embodiment, have a length of approximately 2 mm to 20 mm.

The cut fibers are provided in the belt 10 in a ratio of approximately 0.1 to 3.0 parts to 100 parts of rubber by weight.

The fabric 18 may comprise a canvas fabric. The fabric may be formed with one or more plies, with the warps and wefts of the plies being formed of cotton yarns, blended yarns of cotton and nylon yarns, blended yarns of cotton yarns and polyester yarns, etc. The plies are woven at a wide crossing angle of approximately 90° to 140° and, in the illustrated embodiment, are laminated and bonded to the rubber body with rubber in a bias direction.

It has been found that by utilizing both the longitudinally oriented short fibers in the rubber in which the tensile cords are embedded, and providing the rubber as a relatively hard rubber, maximum extension of useful life of the belt is obtained, with minimized cracking and desirable bending durability with reduced belt-degrading heating during use of the drive system.

Referring now to the embodiments of FIGS. 3–7, the invention comprehends a number of modifications within the broad scope thereof providing improved long, troublefree life of the belt under high load conditions.

Figure 3:
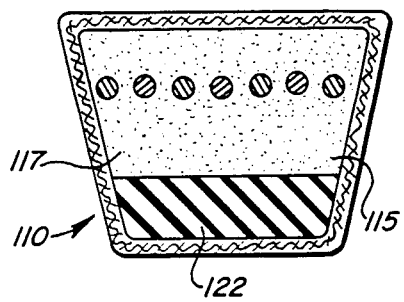
FIG. 3 is a transverse section illustrating a modified form of belt embodying the invention.

As seen in FIG. 3, a modified form of belt generally designated 110 embodying the invention is shown to comprise a belt similar to belt 10 but wherein the innermost portion 122 of the compression section 115 is free of the longitudinally extending cut fibers 117.

Figure 4:
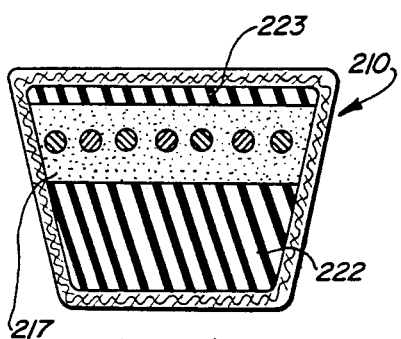
FIG. 4 is a transverse section illustrating another modified form of belt embodying the invention.

Another belt embodying the invention generally designated 210 is shown in FIG. 4 to comprise a belt generally similar to belt 10, but wherein both the outermost portion 223 of the tension section and the innermost portion 222 of the compression section are provided free of the longitudinally extending cut fibers 217.

As further illustrated in FIG. 4, the extent of the cut fiber-free portions of the tension and compression sections outwardly and inwardly of the portion of the belt in which the tensile cords are embedded may be selected, as desired, within the broad scope of the invention.

Figure 5:
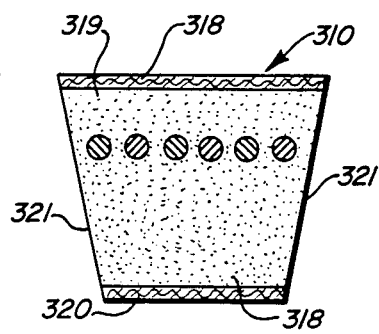
FIG. 5 is a transverse section illustrating still another form of belt embodying the invention.

In FIG. 5, still another form of belt generally designated 310 embodying the invention is shown to comprise a belt similar to belt 10, but wherein the side edges 321 comprise raw edges, with the cover fabric 318 being provided only on the outer surface 319 of the tension section and the inner surface 320 of the compression section.

Figure 6:
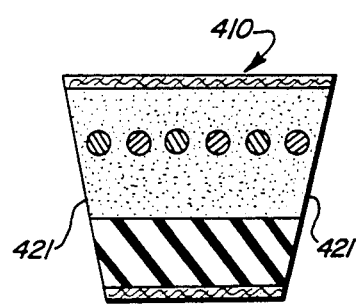
FIG. 6 is a transverse section illustrating a still further belt embodying the invention.

Still another form of the invention generally designated 410 is illustrated in FIG. 6 to comprise a belt similar to belt 110, but wherein the side edges 421 of the belt comprises raw edges.

Figure 7:
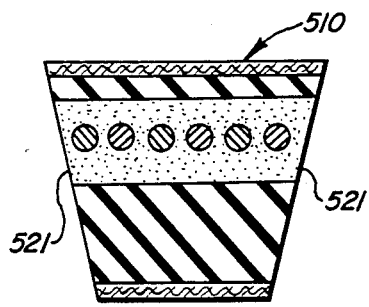
FIG. 7 is a transverse section illustrating yet another belt embodying the invention.

A belt generally designated 510 is illustrated in FIG. 7 to comprise a belt generally similar to belt 210, but wherein the side edges 521 thereof comprise raw edges.

Figure 8:
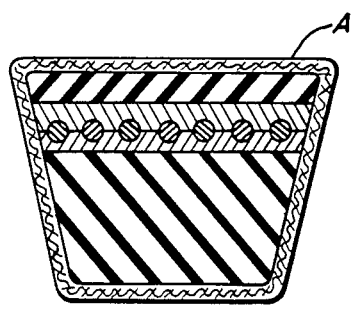
FIG. 8 is a transverse section illustrating a conventional prior art belt.
Figure 9:
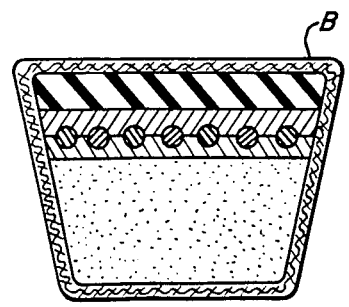
FIG. 9 is a transverse section illustrating a prior art belt developed by applicants herein.

The unexpected extended useful life of the power transmission belts embodying the invention is illustrated in the following Table 1, wherein the belt 10 is shown to have a substantially increased useful life over the prior art belts of FIGS. 8 and 9. In determining the comparison of useful life, the belts were driven in a drive system, as shown in FIG. 1, wherein the driver pulley was 80 mm in diameter, the driven pulley was 74 mm in diameter, with the driver pulley being rotated at a speed of 3600 rpm. 6 PS of load and 100 kg of initial load were applied.

TABLE 1

|  | Belt 10 (FIG. 2) | Conventional belts | |
|---|---|---|---|
|  |  | Belt A (FIG. 8) | Belt B (FIG. 9) |
| Running life (Hrs) Before side cracking | 487 | 143 | 260 |

As shown in Table 1, the provision of the longitudinally extending short fibers in the portion of the rubber body in which the tensile cords are embedded provides an unexpectedly substantial increase in the useful life of the belt.

The provision of the longitudinally extending short fibers in the portion of the rubber in which the tensile cords is embedded has been unexpectedly found to provide desirable transverse side pressure durability under high loads, while yet providing desirable bending and crack resistance under such high loads.

By substantially extending the useful life of the belt before side cracking occurs, lowered maintenance and parts costs provide a highly meritorious improvement in the power transmission of high loads in such pulley systems.

The foregoing disclosure of specific embodiments is illustrative of the broad inventive concepts comprehended by the invention.

We claim:

1. In a power transmission V-belt for transmitting a high load, said V-belt comprising a belt body having an inner compression section and an outer tension section, and longitudinally extending tensile elements embedded in said V-belt between said sections, the improvement comprising the portion of said V-belt in which said tensile elements are embedded comprising hard rubber having short reinforcing fibers distributed therein and oriented longitudinally of the V-belt and present in the ratio of less than 5 parts to 100 parts of rubber by weight.

2. In a power transmission V-belt for transmitting a high load, said V-belt comprising a belt body having an inner compression section and an outer tension section, and longitudinally extending tensile elements embedded in said V-belt between said sections, the improvement comprising the portion of said V-belt in which said tensile elements are embedded comprising rubber having short reinforcing fibers distributed therein and oriented longitudinally of the V-belt, said fibers being present in the ratio of approximately 0.1 to 3.0 parts to 100 parts of rubber by weight.

3. In a power transmission V-belt for transmitting a high load, said V-belt comprising a belt body having an inner compression section and an outer tension section, and longitudinally extending tensile elements embedded in said V-belt between said sections, the improvement comprising the portion of said V-belt in which said tensile elements are embedded comprising rubber having short reinforcing fibers distributed therein and oriented longitudinally of the V-belt, said fiber-reinforced rubber having a Shore A hardness of approximately 70° to 90°.

4. The power transmission V-belt of claims 1, 2 or 3 wherein said tensile elements are formed of any one of the group of synthetic resins comprising polyester resin, aliphatic polyamide resin, and aromatic polyamide resin.

5. The power transmission V-belt of claims 1, 2 or 3 wherein said fibers have a length of approximately 2 mm to 20 mm.

6. The power transmission V-belt of claims 1, 2 or 3 wherein said fibers are formed of any one of the group of natural fiber, artificial fiber, synthetic fiber, and inorganic fiber.

7. The power transmission V-belt of claims 1, 2 or 3 wherein said fibers comprise cut fibers.

8. The power transmission V-belt of claims 1, 2 or 3 wherein a rubberized fabric cover is provided on said rubber portion.

9. The power transmission V-belt of claims 1, 2 or 3 wherein a rubberized fabric cover is provided on said rubber portion, said fabric cover comprising bias-laid plies.

10. The power transmission V-belt of claims 1, 2 or 3 wherein a rubberized fabric cover is provided on said rubber portion, said fabric cover being defined by at least one ply having warps and wefts disposed at a 90° to 140° crossing angle.

11. The power transmission V-belt of claims 1, 2 or 3 wherein a rubberized fabric cover is provided on said rubber portion, said fabric cover being formed of yarns formed of any of the group consisting of cotton yarns, blended cotton and nylon yarns, and blended cotton and polyester yarns.

12. The power transmission V-belt of claims 1, 2 or 3 wherein at least one of the outermost portions of the tension section and the innermost portion of the compression section is free of said short fibers.

13. The power transmission V-belt of claims 1, 2 or 3 wherein the entire belt body is formed of rubber having short reinforcing fibers distributed therein and oriented longitudinally of the belt.

* * * * *